| United States Patent [19] | [11] Patent Number: 4,927,665 |
| Chino et al. | [45] Date of Patent: May 22, 1990 |

[54] SIMULTANEOUS MULTI-LAYER COATING METHOD FOR MANUFACTURING MAGNETIC RECORDING MEDIUM

[75] Inventors: Naoyoshi Chino; Tsunehiko Sato; Shinji Saito; Hiroshi Ogawa, all of Kanagawa, Japan

[73] Assignee: Fuji Photo Film Co., Ltd., Kanagawa, Japan

[21] Appl. No.: 420,410

[22] Filed: Oct. 12, 1989

[30] Foreign Application Priority Data

Oct. 13, 1988 [JP] Japan ................................ 62-255967

[51] Int. Cl.$^5$ ............................................. H01F 10/02
[52] U.S. Cl. ..................................... 427/131; 428/900
[58] Field of Search ................................. 427/128–132, 427/48; 428/900, 694

*Primary Examiner*—Bernard Pianalto
*Attorney, Agent, or Firm*—Sughrue, Mion, Zinn, Macpeak & Seas

[57] ABSTRACT

A method for simultaneously forming a plurality of organic-solvent-based magnetic layers on a moving support for the manufacture of a magnetic recording medium or the like. The surface tension of a solvent used to form the uppermost of the layers is made lower than that of the other layers. The most preferred range of the surface tension of the solvent which forms the uppermost layer is in a range of 0.1 to 3 dynes.

7 Claims, No Drawings

SIMULTANEOUS MULTI-LAYER COATING METHOD FOR MANUFACTURING MAGNETIC RECORDING MEDIUM

BACKGROUND OF THE INVENTION

The present invention relates to a coating method for simultaneously forming a plurality of organic-solvent-based magnetic layers on a continuously moving nonmagnetic support.

The recent trend has been to make magnetic recording media higher in density and smaller in thickness. To accomplish this, the art has gone from a single-layer to a multi-layer arrangement wherein a plurality of magnetic layers are formed on a nonmagnetic support.

Compared with a magnetic recording medium having a single magnetic layer, a magnetic recording medium having a plurality of magnetic layers has much better magnetic recording characteristics, for instance, a better magnetic data storage capacity. Thus, there has been a demand for the provision of magnetic recording media having two or more magnetic layers.

In general, formation of a plurality of magnetic layers on a support is carried out by, as is disclosed, for instance, by Japanese Patent Application Publications Nos. 43362/1979 and 43816/1983 and Japanese Published Unexamined Patent Applications Nos. 119204/1976, 51908/1977 and 16604/1978, wherein coating solutions such as those described above are applied onto a support and the solution layers are dried one by one to form a multi-layer structure.

However, the conventional method is disadvantageous in that since coating solution applying and drying operations must be repeatedly carried out, the productivity of the overall process is undesirably low, the coating apparatus is unavoidably bulky, and accordingly the cost of the equipment is high. In addition, sometimes irregularities occur in the interfaces between the various layers formed on the support, with the result that unwanted tape modulation noise is liable to occur. There has thus been a strong demand for the provision of a method for forming multiple layers on a support using only a single coating solution applying and drying step. In order to meet this requirement, Japanese Published Unexamined Patent Applications Nos. 212933/1987 and 124631/1987 have disclosed a method for simultaneously forming a plurality of magnetic layers on a support by coating. However, this method is still disadvantageous in that, in the case when nonmagnetic coating solutions and organic-solvent-based or other magnetic solutions are simultaneously applied to the support to form multiple layers thereon, depending on the compositions of the coating solutions, the coating solution for the upper layer may not be uniformly applied to the support, as a result of which the desired two layers cannot be formed properly, or it is completely impossible to apply the coating solution for the upper layer to the lower layer on the support. This difficulty is significant when the quantity of coating solution per unit area (i.e., the coating rate) for the upper layer is low, for instance, 15 cc/m$^2$ or less, more particularly 10 cc/m$^2$ or less, or when the coating speed is high, for example, about 100 m/min or more. On the other hand, if the layers have a thickness such that they can more easily be formed on the support, the surface of the resultant magnetic tape may become unacceptable. That is, if such a tape is used as a magnetic video tape, the reproduced signals will suffer from high noise level.

Another example of a multi-layer coating method has been proposed, for instance, in Japanese Unexamined Published Patent Application No. 126648/1985 for manufacture of photographing photosensitive materials. In accordance with this method, the coating solution for the upper layer is made to have a lower surface tension than that of the lower layer.

However, it is difficult to accurately measure the surface tension of each of the coating solutions forming the magnetic recording medium. Moreover, the above-described coating method is not suitable as a coating method for manufacturing magnetic recording media since the above-described magnetic coating solutions have a considerably high viscosity and are liable to condense and dry because they are organic solvent dispersion liquids. Therefore, measurement of the surface tension causes the solution surface to become wavy, as a result of which the ring or glass plate of the surface tension meter cannot be uniformly brought into contact with the solution surface; that is, it is difficult to accurately measure the surface tension. Furthermore, a magnetic coating solution obtained immediately after agitation at high speed and the same magnetic coating solution allowed to stand have significantly different viscosities, and accordingly different surface tensions, which adversely affects the measurement.

In order to decrease the surface tension of the upper layer described above, the aforementioned Japanese Published Unexamined Patent Application No. 126648/1985 has disclosed a method of using surface active agents, namely, those of the anion, cation and non-ion types, and amphoteric surface active agents. However, the surface active agents exhibit no great surface activity for organic-solvent-based magnetic coating solutions since the two differ in polar and oily groups, and thus are generally unable to greatly vary the surface tension of the magnetic coating solution.

SUMMARY OF THE INVENTION

Accordingly, an object of the invention is to eliminate the above-described difficulties accompanying a conventional multi-layer coating method. More specifically, an object of the invention is to provide a simultaneous multi-layer coating method for magnetic recording media which can be employed to manufacture with high efficiency multi-layer magnetic recording media which have excellent surface characteristics and good magnetic recording characteristics.

The foregoing and other objects of the invention have been achieved by the provision of coating method in which a plurality of layers of organic solvent are simultaneously formed on a continuously running nonmagnetic support for manufacture of a magnetic recording medium in which, according to the invention, the surface tension of a solvent composition containing at least two types of solvents and which is used to form any one of the remaining layers. The term "solvent composition" as used herein is intended to mean a composition determined by the types and molecular weights of organic solvents used.

The surface tension of the solvent composition of the uppermost of the plurality of coating solutions is smaller than that of the solvent composition of any of the remaining coating solutions. The surface tension of the solvent composition of the uppermost of the coating solutions may be in a range of 0.1 to 10 dynes/cm at 25°

C., preferably 0.1 to 5 dyne/cm, more preferably 0.1 to 3 dyne/cm.

That is, in a multi-layer coating operation, the surface tension of the uppermost layer coating solution should be as small as possible.

The surface tension of the solvent composition of the uppermost layer coating solution may be made smaller than that of the solvent composition of the remaining coating solution layers by either: (1) adding a solvent low in surface tension to the uppermost coating solution layer, or (2) adding a solvent high in surface tension to the remaining coating solution layers.

Typical examples of suitable solvents low in surface tension are hydrocarbon solvents, amine solvents and fluorine radical solvents; however, they are not so suitable in practical use because they adversely affect the solubility of a binder for magnetic recording media, they condense, or they are poisonous.

On the other hand, typical examples of solvents of high surface tension are halogenide solvents (dichloroethane), nitride solvents (nitromethane and ethylene diamine), and "Cellosolve"-type hydroxycellulose solvents; however, they are also not practical in use because they are poisonous. Also, they generally have a high boiling point. Moreover, if such solvents are used in large quantities, it takes a relatively long time to dry the coated layers or to reduce the amount of solvent remaining in the films, which lowers the productivity and increases the cost of the equipment.

DESCRIPTION OF THE PREFERRED EMBODIMENTS

As conducive to a full understanding of the invention, specific examples thereof will be described in detail.

Coating Solution:

Magnetic coating solutions having the following compositions were prepared:

| Composition | |
|---|---|
| Co-γ-Fe₂ (Hc 550 Oe) | 100 parts by weight |
| Vinyl chloride, vinyl acetate, vinyl alcohol copolymer | 15 parts by weight |
| Polyurethane resin "Nipporan-2301" (manufactured by Nippon Polyurethane Co., Ltd.) | 8 parts by weight |
| Polyisocyanate "Coronate L" (manufactured by Nippon Polyurethane Co., Ltd.) | 8 parts by weight |
| Carbon black (average grain size 20 μm) | 12 parts by weight |
| Stearic acid | 1 part by weight |
| Butyl stearate | 1 part by weight |
| Solvent | |
| methyl ethyl ketone | A parts by weight |
| butyl acetate | B parts by weight |

The methyl ethyl ketone and the butyl acetate were mixed according to the following Table 1 to prepare five coating solutions.

TABLE 1

| Coating solution No. | 1 | 2 | 3 | 4 | 5 |
|---|---|---|---|---|---|
| Methyl ethyl ketone A (parts by wt) | 240 | 180 | 150 | 120 | 60 |
| Butyl acetate B (parts by wt) | 60 | 120 | 150 | 180 | 240 |
| Solvent surface tension | 24.2 | 24.4 | 24.5 | 24.6 | 24.8 |

TABLE 1-continued

| Coating solution No. | 1 | 2 | 3 | 4 | 5 |
|---|---|---|---|---|---|
| (dyne/cm, 25° C.) | | | | | |

INVENTION EXAMPLE 1

The above-described coating solutions were simultaneously applied to a polyethylene terephthalate support in such a manner that the upper layer coating solution was applied at a rate of 20 cc/m², while the lower layer coating solution was applied at various rates, namely, 20, 10, 8, 6, 4, 2 and 1 cc/m². A coating apparatus of the extrusion head type, as disclosed by Japanese Unexamined Published Patent Application No. 88080/1988, was used under the following coating conditions: The coating speed was 200 m/min, the tension of the part being coated was 10 kg/520 mm (width), and the coating width was 500 mm.

It was investigated whether or not the upper layer of each of Specimens 1 through 3 produced as described above was satisfactory. The results of the investigation are as indicated in the following Table 2:

TABLE 2

| | | Specimen No. | | | | |
|---|---|---|---|---|---|---|
| | | | | | Compar. Ex. | |
| | | 1 | 2 | 3 | 4 | 5 |
| Coating Solution No. | Upper Layer | 2 | 1 | 1 | 4 | 5 |
| | Lower Layer | 3 | 3 | 5 | 3 | 1 |
| Solvent Surface Tension Difference in Coating Solution (dyne/cm) | | 0.1 | +0.3 | +0.6 | −0.1 | −0.6 |
| Coating Rate of Upper Layer Coating Solution | 20 | O | O | O | O | D |
| | 10 | O | O | O | D | X |
| | 8 | O | O | O | X | X |
| | 6 | O | O | O | X | X |
| | 4 | O | O | O | X | X |
| | 2 | D | O | O | X | X |
| | 1 | D | O | O | X | X |

O: Both layers were formed satisfactorily.
D: Multi-layer formed was partially irregular, but product was substantially satisfactory in practical use.
X: The upper layer could not be formed.

In Table 2, the term "solvent surface tension difference in coating solution" is intended to mean the difference which is obtained by subtracting the surface tension of the solvent composition in the upper layer coating solution from the surface tension of the solvent composition in the lower layer coating solution.

As is apparent from Table 2, in Inventive Example 1 in which the surface tension of the solvent composition in the upper layer coating solution was lower than the surface tension of solvent composition in the lower layer coating solution, the multiple layers were formed satisfactorily, irrespective of the coating rate of the upper layer coating solution.

On the other hand, as is apparent from the Comparison Example, with Specimens 4 and 5 in which the surface tension of the solvent composition in the upper layer coating solution was higher than the surface tension of the solvent composition in the lower layer coating solution, it became difficult to form the upper layer as the coating rate of the upper layer decreased.

INVENTIVE EXAMPLE 2

The parts by weight of methyl ethyl ketone and butyl acetate of the coating solutions as employed in Inventive Example 1 were changed as indicated in Table 3 to prepare coating solutions 6 through 9.

Coating operations were carried out in the same manner as in Inventive Example 1 with the coating solutions 6 through 9 used for the lower layer and with the coating solution 3 used for the upper layer. It was found that the multiple layers were formed satisfactorily even when the coating rate of the upper layer was reduced to 1 cc/m$^2$.

Samples were produced using the lower layer coating solutions 7, 8 and 9 under conditions where the lower layer coating rate was 20 cc/m$^2$, and drying was carried out for eight (8) seconds. In these samples, the amount of solvent remaining in the layer (residual solvent) was 3 mg/m$^2$ for the lower layer coating solution 8, and 15 mg/m$^2$ for the coating solution 9.

Recording tapes produced from these samples were placed in cassettes and subjected to various tests. In the case where the lower layer coating solution 9 was used, because of the residual solvent, the product emitted a foul odor. In addition, due to the large quantity of residual solvent, tape segments stuck to one another, the tape ran irregularly when played, and drop-out occurred frequently when the tape was repeatedly used. Thus the product was not practical in actual use.

These difficulties were attributed to the boiling and absorptivity of the solvent used. However, in general, a solvent high in boiling point is high in surface tension, and it is undesirable to use solvents which are excessively different in surface tension.

TABLE 3

| Coating Solution No. | | 6 | 7 | 8 | 9 |
|---|---|---|---|---|---|
| Solvent | methyl ethyl ketone (parts by weight) | 150 | 150 | 150 | — |
| | butyl acetate (parts by weight) | 30 | 120 | 60 | — |
| | toluene (parts by weight) | 120 | — | — | 120 |
| | cyclohexanone (parts by weight) | — | 30 | 90 | 180 |
| Solvent Composition Surface Tension (dyne/cm, 25° C.) | | 26.2 | 25.5 | 27.0 | 30.2 |

INVENTIVE EXAMPLE 3

The multi-layer coating solutions, namely, the upper and lower coating solutions of Specimens 3 and 4 in Inventive Example 1, were simultaneously applied to supports in the same manner as in Inventive Example 1 under coating conditions where the coating speed was 50 m/min, and the upper and lower layers coating rates were 20 cc/m$^2$ and 10 cc/m$^2$, respectively.

The upper layers of the specimens were tested for surface roughness. The surface roughness of Specimen 3 was Ra=0.018 (ten-point average), and the surface roughness of Specimen 5 was Ra=0.35 (ten-point average). The surface roughness of the base itself was 0.015. That is, in Specimen 3 in which the surface tension of the solvent composition in the upper layer coating solution was lower than the surface tension of the solvent composition in the lower layer coating solution, the surface roughness of the upper layer was acceptable.

As described above, in the inventive multi-layer coating method for simultaneously applying a plurality of coating solutions onto a nonmagnetic support for manufacturing a magnetic recording medium, the surface tension of the solvent composition in the uppermost of the plurality of coating solutions is made lower than the surface tension of the solvent composition in any of the remaining coating solutions, as a result of which the resultant product is satisfactory irrespective of the coating speed and the coating rate. Furthermore, with the invention the surface tensions of the solvent compositions forming the layers on the support can be measured accurately, and they can be readily changed by changing the solvent compositions.

Thus, the method of simultaneously applying a plurality of coating solutions onto a nonmagnetic support according to the invention can be used to manufacture a multi-layer magnetic recording medium excellent both in surface roughness and in magnetic recording characteristics with high efficiency.

What is claimed is:

1. In a coating method in which a plurality of organic-solvent-based layers are simultaneously formed on a nonmagnetic support which is continuously run to manufacture a magnetic recording medium, the improvement wherein a surface tension of a solvent composition comprising at least two types of solvents and which is used to form an uppermost one of said plurality of layers is lower than a surface tension of a solvent composition comprising at least two types of solvents and which is used to form the remaining layers, said surface tension of said solvent composition forming said uppermost of said plurality of layers being in a range of 0.1 to 10 dyne/cm.

2. The coating method of claim 1, wherein said surface tension of said solvent composition forming said uppermost of said plurality of layers is in a range of 0.1 to 5 dyne/cm.

3. The coating method of claim 1, wherein said surface tension of said solvent composition forming said uppermost of said plurality of layers is in a range of 0.1 to 3 dyne/cm.

4. The coating method of claim 1, wherein the solvent composition of said uppermost layer coating solution differs from that of said remaining layers by the addition to said uppermost layer coating solution of a solvent of low surface tension.

5. The coating method of claim 4, wherein said solvent of low surface tension comprises a solvent selected from the group consisting of hydrocarbon solvents, amine solvents, and fluorine radical solvents.

6. The coating method of claim 1, wherein the solvent composition of said uppermost layer coating solution differs from that of said remaining layers by the addition to said coating solution of said remaining layers of a solvent of high surface tension.

7. The coating method of claim 6, wherein said solvent of high surface tension comprises a solvent selected from the group consisting of halogenide solvents, nitride solvents, and hydroxycellulose solvents.

* * * * *

UNITED STATES PATENT AND TRADEMARK OFFICE
CERTIFICATE OF CORRECTION

PATENT NO. : 4,927,665

DATED : May 22, 1990

INVENTOR(S) : Chino et al.

It is certified that error appears in the above-identified patent and that said Letters Patent is hereby corrected as shown below:

Title Page, item [30];

Change "62-255967" to --63-255967-- under "Foreign Application Priority Data"

Signed and Sealed this

Ninth Day of March, 1993

Attest:

STEPHEN G. KUNIN

Attesting Officer

Acting Commissioner of Patents and Trademarks